United States Patent
Zhang et al.

(10) Patent No.: US 10,404,479 B2
(45) Date of Patent: Sep. 3, 2019

(54) CHARGING FOR MTC SMALL DATA TRANSMISSION AND TRIGGER AT MTC-IWF

(71) Applicant: NEC Corporation, Tokyo (JP)

(72) Inventors: Xiaowei Zhang, Tokyo (JP); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/021,492

(22) PCT Filed: Aug. 4, 2014

(86) PCT No.: PCT/JP2014/004073
§ 371 (c)(1),
(2) Date: Mar. 11, 2016

(87) PCT Pub. No.: WO2015/037181
PCT Pub. Date: Mar. 19, 2015

(65) Prior Publication Data
US 2016/0226668 A1    Aug. 4, 2016

(30) Foreign Application Priority Data

Sep. 12, 2013   (JP) ................................ 2013-189776

(51) Int. Cl.
*H04L 12/14*   (2006.01)
*H04M 15/00*   (2006.01)
(Continued)

(52) U.S. Cl.
CPC ......... *H04L 12/1403* (2013.01); *H04B 7/155* (2013.01); *H04L 12/1425* (2013.01);
(Continued)

(58) Field of Classification Search
CPC ..... H04L 47/19; H04L 47/20; H04L 12/1496; H04L 41/5006; H04L 47/2425;
(Continued)

(56) References Cited

U.S. PATENT DOCUMENTS

2013/0051282 A1   2/2013 Lim et al.
2013/0084901 A1   4/2013 Pudney
(Continued)

FOREIGN PATENT DOCUMENTS

CN    102111739 A    6/2011
JP    2013-541278 A   11/2013
(Continued)

OTHER PUBLICATIONS

3GPP TR 23.887, "Machine-Type and other Mobile Data Applications Communications Enhancements (Release 12)", V1.0.0, Jun. 2013, pp. 1-133, hereinafter D1.*
(Continued)

*Primary Examiner* — Christopher M Brandt
*Assistant Examiner* — Jing Gao
(74) *Attorney, Agent, or Firm* — Foley & Lardner LLP

(57) ABSTRACT

In order for charging SDT and MTC device trigger over control plane, there is provided a network node (40) that relays messages over a control plane (T5 and Tsp) between an MTC device (10) and an SCS (50). The network node (40) counts the number of messages successfully relayed, and generates a CDR in accordance with the counted number. The messages are SDT messages delivered from the MTC device (10) to the SCS (50), SDT messages delivered from the SCS (50) to the MTC device (10), or MTC device trigger messages delivered from the SCS (50) to the MTC device (10). The network node (40) transfers the CDR to an OCF (31) or a CDF (32).

12 Claims, 4 Drawing Sheets

(51) Int. Cl.
*H04B 7/155* (2006.01)
*H04W 4/24* (2018.01)
*H04W 4/70* (2018.01)

(52) U.S. Cl.
CPC ...... *H04L 12/1432* (2013.01); *H04L 12/1467* (2013.01); *H04M 15/64* (2013.01); *H04M 15/8214* (2013.01); *H04M 15/8221* (2013.01); *H04W 4/24* (2013.01); *H04W 4/70* (2018.02)

(58) Field of Classification Search
CPC ... H04L 47/822; H04L 12/1403; H04L 7/155; H04L 12/1425; H04L 14/1243; H04L 12/1467; H04M 2203/558; H04M 15/64; H04M 15/00; H04M 15/09; H04M 15/31; H04M 15/58; H04M 15/61; H04M 15/73; H04M 15/80; H04M 15/8221; H04M 15/8214; H04M 15/41; H04M 15/43; H04M 15/44; H04M 15/30; H04M 15/66; H04M 15/8016; H04M 15/8055; H04M 15/81; H04W 12/08; H04W 28/0215; H04W 4/26; H04W 28/12; H04W 28/20; H04W 4/24; H04W 12/06; H04W 8/183; H04W 88/06; H04W 4/005
See application file for complete search history.

(56) References Cited

U.S. PATENT DOCUMENTS

| 2015/0003298 | A1* | 1/2015 | Cai | H04M 15/60 370/259 |
| 2015/0016307 | A1* | 1/2015 | Liu | H04W 4/14 370/259 |

FOREIGN PATENT DOCUMENTS

| WO | WO-2012/034080 A1 | 3/2012 |
| WO | WO 2013/189708 | * 12/2013 |

OTHER PUBLICATIONS

3GPP TR 23,887 V.1.1.0. 3rd Generation Partnership Project; Technical Specification Group Services and System Aspects; Machine-Type and other mobile data applications communications enhancements, Release 12, Jul. 2013 (153 pgs.).*
PCR: Modification to MTC-IWF based security solution for small data transmission; 3GPP TSG SA WG3 (Security) Meeting #72, Jul. 8-12, 2013; Qingdao (China), S3-130861 (Year: 2013).*
Roaming architecture for device triggering; SA WG2 Meeting #94; Nov. 12-16, 2012, New Orleans, USA, S2-124472 (Year: 2012).*
3GPP TR 23.887, V1.0.0, Technical Specification Group Services and System Aspects; Machine-Type and Other Mobile Data Applications Communications Enhancements, Jun. 2013 (133 pgs.).
3GPP TS 32.240, V12.0.0, Technical Specification Group Services and System Aspects; Telecommunication Management; Charging Management; Charging architecture and principles, Release 12, Mar. 2013 (45 pgs.).
3GPP TS 23.682, V11.4.0, Technical Specification Group Services and System Aspects; Architecture enhancements to facilitate communications with packet data networks and applications, Release 11, Jun. 2013 (29 pgs.).
3GPP TS 22.368, V12.2.0, Technical Specification Group Services and System Aspects; Service Requirements for Machine-Type Communications (MTC); Stage 1, Release 12, Mar. 2013 (24 pgs.).
Ericsson, "Recording Information for Statistical and Offline Charging in M2M", M2M(12)19_072r2, Change Request 102 690, Version 2.0.1, Mar. 23, 2012 (9 pgs.).
International Search Report and Written Opinion dated Dec. 10, 2014 in PCT/JP2014/004073 (10 pgs.).
Office Action dated Oct. 17, 2017 in related Japanese Appl. No. 2016-512145 with English-language translation (6 pgs.).
NEC Corporation, "pCR: Modification to MTC-IWF based security solution for small data transmission", 3GPP TSG SA WG3 (Security) Meeting #72, S3-130861, Jul. 12, 2013 (8 pgs.).
Nokia Siemens Networks, Nokia Corporation. "Roaming architecture for device triggering". 3GPP Draft, S2-124472, SA WG2 Meeting #94, Nov. 12-16, 2012 (7 pgs.).
Office Action dated Jun. 19, 2018 in related Japanese Appl. No. 2016-512145 with English-language translation (7 pgs.).
First Office Action dated Nov. 22, 2018 in related Chinese Appl. 201480050377.6 with English-language translation (25 pgs.).

* cited by examiner

[Fig. 1]
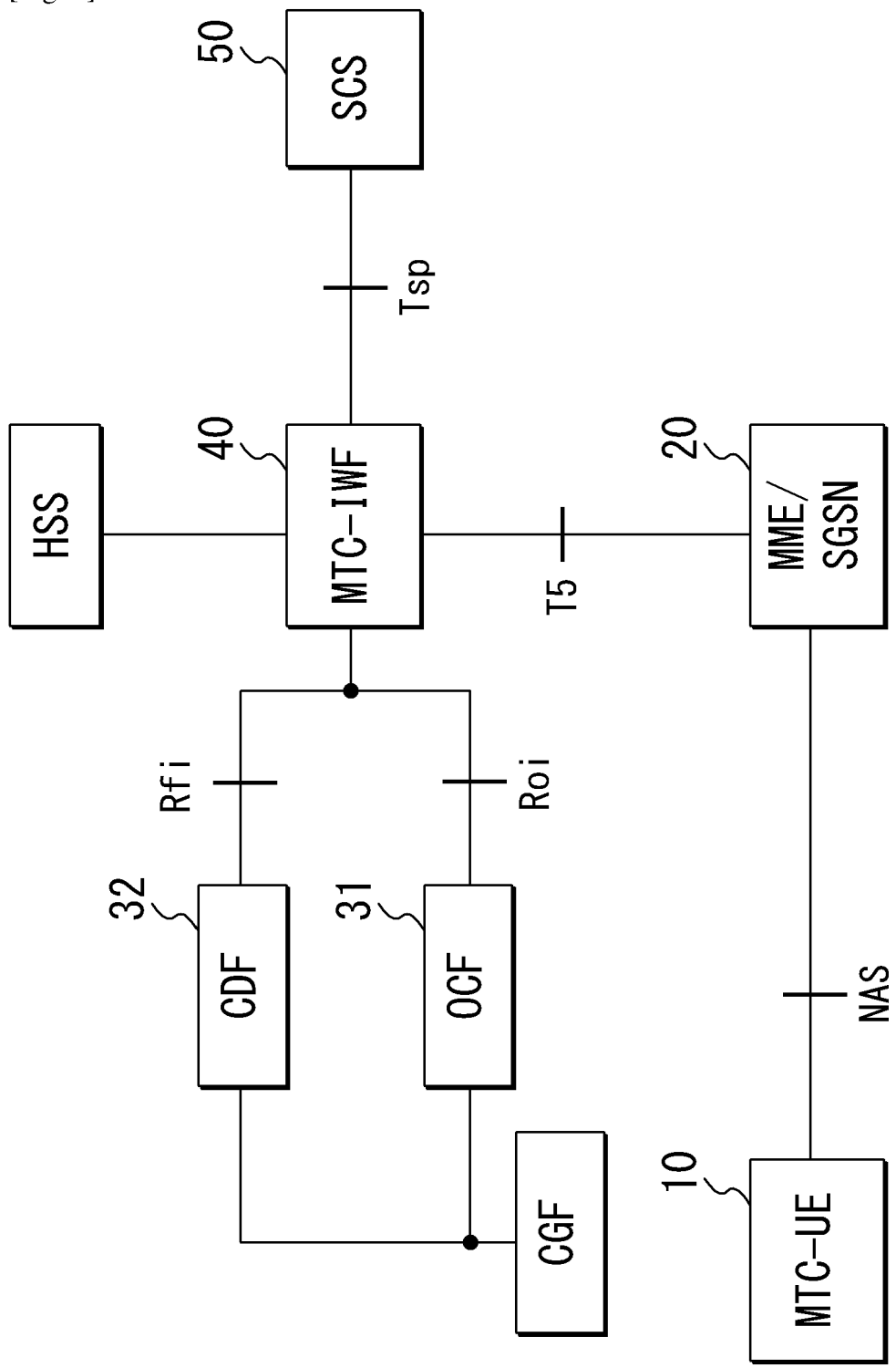

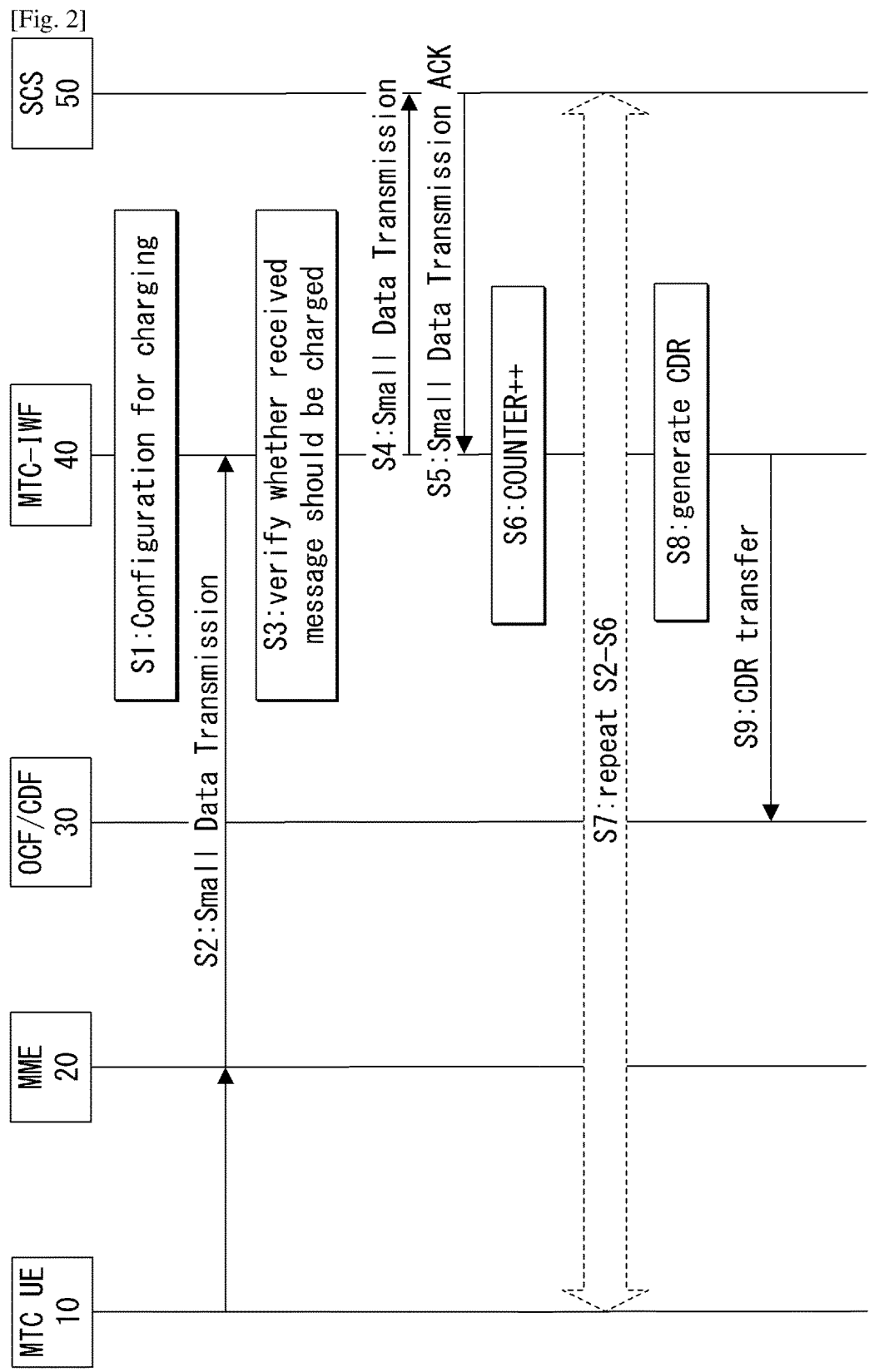

[Fig. 3]
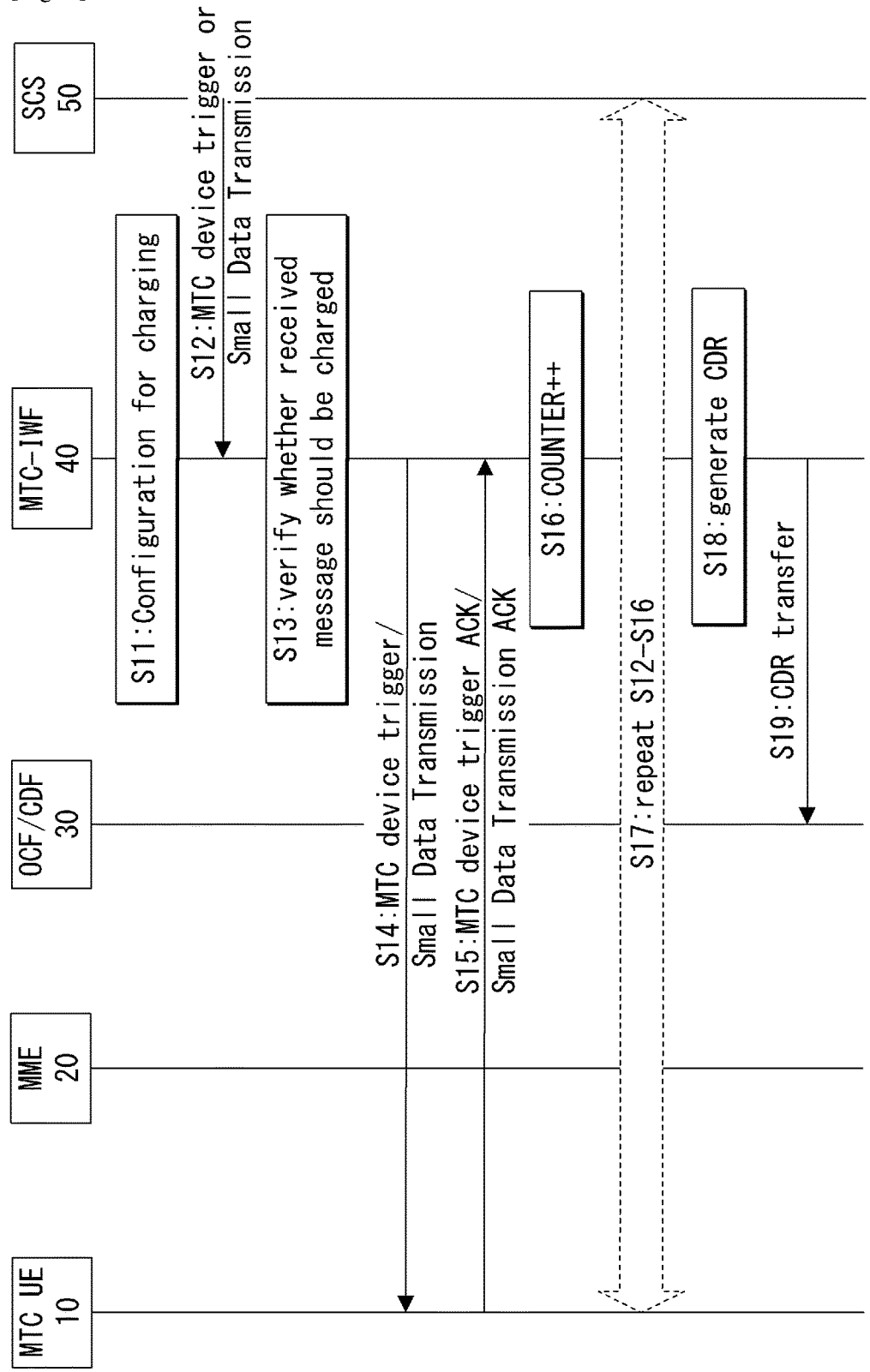

[Fig. 4]
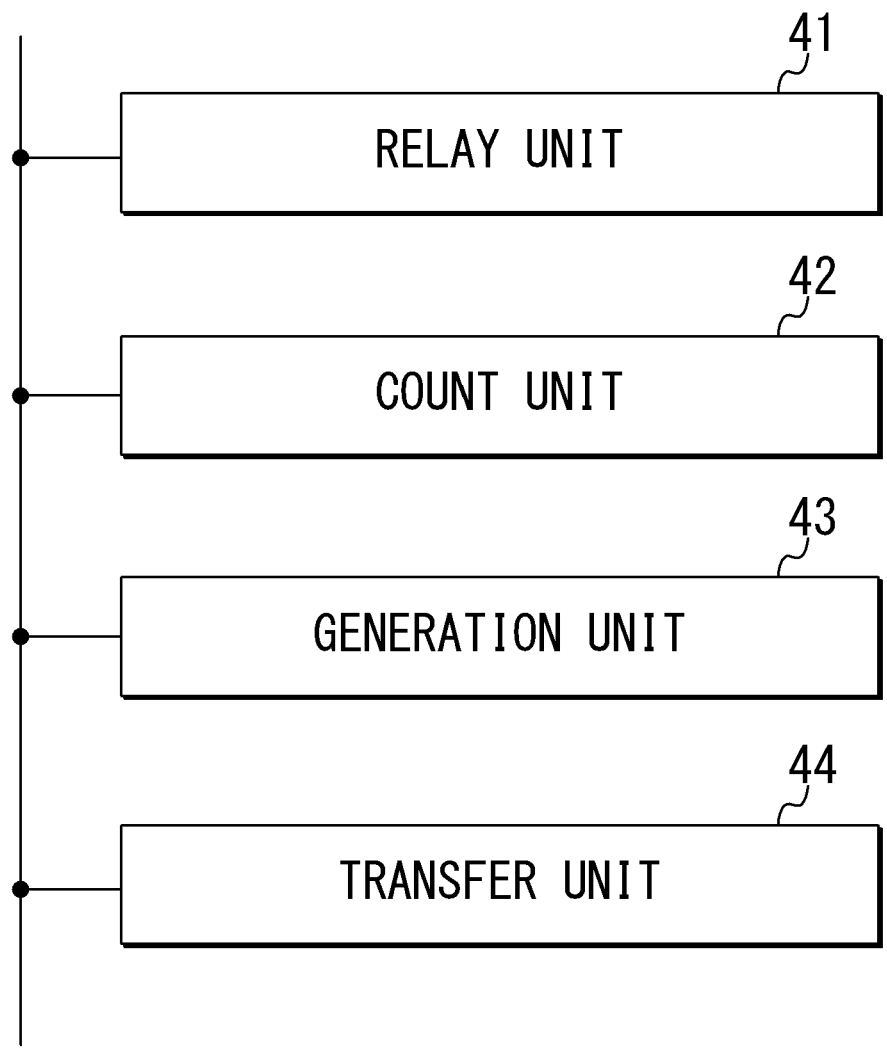

CHARGING FOR MTC SMALL DATA TRANSMISSION AND TRIGGER AT MTC-IWF

TECHNICAL FIELD

The present invention relates to charging for SDT (Small Data Transmission) and device trigger in MTC (Machine-Type-Communication).

BACKGROUND ART

In NPL 1, the study of SDT has a high priority. Moreover, SDT over control plane has been agreed in 3GPP (3rd Generation Partnership Project). Therefore, Charging the SDT over control plane becomes an issue.

CITATION LIST

Non Patent Literature

NPL 1: 3GPP TR 23.887, "Machine-Type and other Mobile Data Applications Communications Enhancements (Release 12)", V1.0.0, 2013-06, Clauses 5.1.1.3.3.1.4 and 5.2.2.3.1.1.2, pp. 23 and 76

NPL 2: 3GPP TS 32.240, "Telecommunication management; Charging management; Charging architecture and principles (Release 12)", V12.0.0, 2013-03, Clauses 4.1.1 and 4.1.2, pp. 16

SUMMARY OF INVENTION

Technical Problem

In NPL 1, there are few descriptions of an MME (Mobility Management) or an MTC-IWF (MTC Inter-Working Function) generating a CDR (Charging Data Record) for SDT and MTC device trigger.

However, in NPL 1, there is no detail of how the CDR can be generated and transferred.

Note that NPL 2 discloses charging over user plane, but does not at all disclose the charging over the control plane.

Accordingly, an exemplary object of the present invention is to provide a solution for charging SDT and MTC device trigger over control plane.

Solution to Problem

In order to achieve the above-mentioned object, a network node according to first exemplary aspect of the present invention includes: relay means for relaying messages over a control plane between an MTC device and an SCS (Service Capability Server); count means for counting the number of messages successfully relayed; and generation means for generating a CDR in accordance with the counted number. The messages are: first messages delivered from the MTC device to the SCS, the size of the first message being equal to or smaller than a predetermined size; second messages delivered from the SCS to the MTC device, the size of the second message being equal to or smaller than the predetermined size; or trigger messages delivered from the SCS to the MTC device, the trigger message being for causing the MTC device to communicate with the SCS.

Further, a communication system according to second exemplary aspect of the present invention includes: an MTC device; an SCS; and a network node that relays messages over a control plane between the MTC device and the SCS. The network node is configured to: count the number of messages successfully relayed; and generate a CDR in accordance with the counted number. The messages are: first messages delivered from the MTC device to the SCS, the size of the first message being equal to or smaller than a predetermined size; second messages delivered from the SCS to the MTC device, the size of the second message being equal to or smaller than the predetermined size; or trigger messages delivered from the SCS to the MTC device, the trigger message being for causing the MTC device to communicate with the SCS.

Furthermore, a method according to third exemplary aspect of the present invention provides a method of controlling operations in a network node that relays messages over a control plane between an MTC device and an SCS. This method includes: counting the number of messages successfully relayed; and generating a CDR in accordance with the counted number. The messages are: first messages delivered from the MTC device to the SCS, the size of the first message being equal to or smaller than a predetermined size; second messages delivered from the SCS to the MTC device, the size of the second message being equal to or smaller than the predetermined size; or trigger messages delivered from the SCS to the MTC device, the trigger message being for causing the MTC device to communicate with the SCS.

Advantageous Effects of Invention

According to the present invention, it is possible to solve the above-mentioned problems, and thus to provide a solution for charging SDT and MTC device trigger over control plane.

BRIEF DESCRIPTION OF DRAWINGS

FIG. 1 is a block diagram showing a configuration example of a communication system according to an exemplary embodiment of the present invention.

FIG. 2 is a sequence diagram showing an operation example of the communication system according to the exemplary embodiment.

FIG. 3 is a sequence diagram showing another operation example of the communication system according to the exemplary embodiment.

FIG. 4 is a block diagram showing a configuration example of a network node according to the exemplary embodiment.

DESCRIPTION OF EMBODIMENTS

Hereinafter, an exemplary embodiment of the present invention will be described with the accompany drawings.

In this exemplary embodiment, there will be proposed solutions for charging SDT and MTC device trigger for both non-roaming and roaming UEs (User Equipments). The solutions can also be applied to other communications that are transferred through an MTC-IWF. Moreover, there will be introduced new interfaces for charging. This can also be applied to any other data delivered over T5 that an operator wants to charge.

For example in 3GPP, the SDT supports the message size of up to 1 kB. Some typical examples of small data include a measurement value of a sensor or meter, and sales in a vending machine. The MTC device trigger is a message for causing an MTC device to communicate with an SCS. The MTC device is a UE equipped for MTC, which will be sometimes referred to as "MTC UE" or "UE" in the following explanation.

<Non-Roaming Case>

As disclosed in NPL 1, the MTC-IWF can generate CDRs for SDT and MTC device trigger. This exemplary embodiment introduces the solution for the MTC-IWF to generate and deliver CDRs. The architecture is shown in FIG. 1.

As shown in FIG. 1, a communication system according to this exemplary embodiment includes a core network (3GPP network), one or more MTC UEs 10 which connect to the core network through a RAN (Radio Access Network), and an SCS 50 which is placed outside the core network. Note that although the illustration is omitted, the RAN is formed by a plurality of base stations (e.g., eNBs (evolved Node Bs)).

The MTC UE 10 attaches to the core network. The MTC UE 10 can host one or multiple MTC Applications. The corresponding MTC Applications in the external network are hosted on the SCS 50. The SCS 50 connects to the core network to communicate with the MTC UE 10.

Further, the core network includes, as a part of its network nodes, an MME 20, an OCF (Online Charging Function) 31 for online charging, a CDF (Charging Data Function) 32 for offline charging, and an MTC-IWF 40. The core network also includes, as other network nodes, an SGSN (Serving GPRS (General Packet Radio Service) Support Node), an HSS (Home Subscriber Server), a CGF (Charging Gateway Function) and the like. The HSS manages subscription information on the MTC UE 10, and the like.

The MME 20 relays traffic between the RAN and the MTC-IWF 40. The SGSN functions as with the MME 20.

The OCF 31 and the CDF 32 are connected to the CGF. Note that in the following description, the OCF 31 and the CDF 32 are sometimes referred to as "OCF/CDF", and collectively denoted by the symbol 30.

As with a typical MTC-IWF, the MTC-IWF 40 serves as an entering point to the core network for the SCS 50, and relays messages over control plane (reference points "T5" and "Tsp") between the MTC UE 10 and the SCS 50. Meanwhile, different from the typical MTC-IWF, the MTC-IWF 40 records MTC device trigger, and MO (Mobile Originated) and MT (Mobile Terminated) SDT. Moreover, the MTC-IWF 40 generates and transfers the CDRs to the OCF 31 for online charging or to the CDF 32 for offline charging.

<New Interfaces for CDR Transfer>

A reference point "Roi" resides between the MTC-IWF 40 and the OCF 31 for online charging. A reference point "Rfi" resides between the MTC-IWF 40 and the CDF 32 for offline charging. In order to deliver the CDRs, the MTC-IWF 40 is configured with the address of the OCF 31 or the CDF 32, this can be decided by the operator such that the MTC-IWF 40 can distinguish whether it is online or offline charging.

<CRD Generation>

There is proposed to pre-configure rules for charging in the MTC-IWF 40. Upon receiving a SDT message or an MTC device trigger message, the MTC-IWF 40 verifies whether the message carries SD (Small Data) or device trigger, and the payload size, in order to generate CDR properly.

MTC device trigger and small data have limited packet size, thus the charging should depend on how many MTC device triggers or SD are being successfully delivered. Thus, the MTC-IWF 40 is configured with a counter for charging purpose.

<New Trigger Event and CDR Type>

There is proposed to create three kinds of event: uplink SD from UE (MO-SD), downlink SD (MT-SD), and MTC device trigger (TRIGGER).

The CDRs are defined according to the event trigger: MO-SD-CDR, MT-SD-CDR and TRIGGER-CDR. The generation of the CDRs is triggered by successful delivery of small data in MO or MT direction and MTC device trigger.

The MO-SD-CDR is used to collect charging information related to the transmission of SD in MO direction via the MTC-IWF 40 on behalf of the MTC UE 10. The event trigger for MO-SD-CDR generation is when the MTC-IWF 40 receives MO SD transmission ACK (Acknowledgement) from the SCS 50. The MO-SD-CDR includes details such as CDR type, Counter, UE identifier and subscriber ID if available.

The MT-SD-CDR is used to collect charging information related to the transmission of SD in MT direction via the MTC-IWF 40 on behalf of the SCS 50. The event trigger for MT-SD-CDR generation is when the MTC-IWF 40 receives MT SD transmission ACK from the MTC UE 10. The MT-SD-CDR includes details such as CDR type, Counter, UE identifier and subscriber ID if available.

The TRIGGER-CDR is used to collect charging information related to the delivery of MTC device trigger in downlink direction via the MTC-IWF 40 on behalf of the SCS 50. The event trigger for TRIGGER-CDR generation is when the MTC-IWF 40 receives MTC device trigger delivery ACK from the eNB. The TRIGGER-CDR includes details such as CDR type, Counter, UE identifier and subscriber ID if available.

The following Table. 1 gives an example of fields in the CDR.

TABLE 1

| Field | Description |
| --- | --- |
| Record Type | MO SD; MT SD; MTC device trigger |
| UE Identifier | Identifier of MTC UE |
| Online/offline | Being delivered online or offline |
| SCS info | Information/address of SCS |
| Serving Node (MTC-IWF) | Information/address of MTC-IWF |
| User Location Information | User Location Information from which message originated |
| Message Reference | Reference provided uniquely identifying CDR |
| Event Time Stamp | Time at which message is received by MTC-IWF |
| Counter | Value of counter |

In the Table. 1, a Record Type field indicates which ones of MO SD messages, MT SD messages and MTC device triggers are counted for generating the CDR. A UE Identifier field indicates an identifier of the MTC UE 10. An Online/offline field indicates that the CDR is delivered for online or offline. An SCS info field indicates information and/or an address of the SCS 50. A Serving Node (MTC-IWF) field indicates information and/or an address of the MTC-IWF 40. A User Location Information field indicates user location information from which the message is originated. A Message Reference field indicates a reference for uniquely identifying the CDR. An Event Time Stamp field indicates the time at which the message is received by the MTC-IWF 40. A Counter field indicates a value of the counter.

Note that in a case of using Diameter message for charging, same as other PCNs (Packet switched Core network Nodes), new field of MTC-information may be added to Service-Information (see 3GPP TS 32.299) in Diameter Credit Control and Accounting-Request Message.

<Roaming Case>

In a case where there is an MTC-IWF in VPLMN (Visited PLMN (Public Land Mobile Network)), the MTC-IWF in VPLMN (V-MTC-IWF) may be configured to record and count MTC device trigger, MO and MT SDT, generate and deliver CDRs. The mechanism is the same as the non-roaming case.

Next, operation examples of this exemplary embodiment will be described in detail with reference to FIGS. 2 and 3. Note that a configuration example of the MTC 40 will be described later with reference to FIG. 4.

In a case of generating a CDR for MO SDT, the MTC-IWF 40 is configured with charging conditions for MO SDT, which includes the SD payload size, counter computation timing, CDR generation and transfer timing.

Specifically, as shown in FIG. 2, configuration for charging condition and timing is performed in the MTC-IWF 40 (Step S1). When the MTC UE 10 is attached and authenticated to the core network and the MTC-IWF 40, the MTC-IWF can generate a COUNTER for the UE subscribed service. An initial value of the COUNTER is set with "0".

After that, the MTC-IWF 40 receives SDT message from the MTC UE 10 (Step S2).

At this time, the MTC-IWF 40 verifies whether or not received message should be charged (Step S3).

For example, the MTC-IWF 40 performs the verification based on an indicator which is included in the received message, and which indicates that the received message is the MO SD message, the MT SD message, the MTC device trigger or a different message. In this case, it is possible to simply perform the verification.

The MTC-IWF 40 may perform the verification further based on the actual size of the received message. As described above, the size of SD message is less than or equal to 1 kB. Therefore, the MTC-IWF 40 determines that the received message should be charged when the actual size is less than or equal to 1 kB. In this case, it is prevent a malicious user from falsifying an indicator in a large size message, which should be charged at a metered rate, for the purpose of receiving services at low cost.

The MTC-IWF 40 may perform the verification further based on whether or not the MTC device 10 and the SCS 50 are authorized to communicate with each other. The MTC-IWF 40 determines that the received message should be charged when both of the MTC device 10 and the SCS 50 have been authorized. In this case, it is possible to prevent charging due to malicious attacks or the like.

If the MTC-IWF 40 has succeeded in the verification, the MTC-IWF 40 delivers the SDT message to the SCS 50 (Step S4).

The SCS 50 responds a Small Data Transmission ACK message, upon successfully receiving the SDT message (Step S5).

The MTC-IWF 40 performs counter computation upon receiving the Small Data Transmission ACK message from the SCS 50 (Step 6). Specifically, the MTC-IWF 40 increments the COUNTER by "1".

The above-mentioned Steps S2 to S6 are repeated if any small data transmission needed (Step S7).

After that, the MTC-IWF 40 generates the MO-SD-CDR, at pre-configured timing (Step S8).

Then, the MTC-IWF 40 transfers the generated CDR to OCF/CDF 30 at pre-configured timing (Step S9).

In a case of generating a CDR for MTC device trigger or MT SDT, as shown in FIG. 3, configuration for charging condition and timing is performed in the MTC-IWF 40 (Step S11). When the MTC UE 10 is attached and authenticated to the core network and the MTC-IWF 40, the MTC-IWF can generate a COUNTER for the UE subscribed service. An initial value of the COUNTER is set with "0".

After that, the MTC-IWF 40 receives a MTC device trigger message or a SDT message from the SCS 50 (Step S12).

At this time, the MTC-IWF 40 verifies whether or not the received message should be charged (Step S13). This verification can be performed in a similar manner to that in FIG. 2.

If the MTC-IWF 40 has succeeded in the verification, the MTC-IWF 40 delivers the MTC device trigger message or the SDT message to the MTC UE 10 (Step S14).

The MTC UE 10 responds a MTC device trigger ACK message or a Small Data Transmission ACK message, upon successfully receiving the MTC device trigger message or the SDT message (Step S15).

The MTC-IWF 40 performs counter computation upon receiving the MTC device trigger ACK message or the Small Data Transmission ACK message from the MTC UE 10 (Step 16). Specifically, the MTC-IWF 40 increments the COUNTER by "1".

The above-mentioned Steps S12 to S16 are repeated if any MTC device trigger or Small Data Transmission needed (Step S17).

After that, the MTC-IWF 40 generates the MT-SD-CDR or the TRIGGER-CDR, at pre-configured timing (Step S18).

Then, the MTC-IWF 40 transfers the generated CDR to OCF/CDF 30 at pre-configured timing (Step S19).

According to this exemplary embodiment, it is possible to provide the solution for the MTC-IWF to generate and deliver CDRs for charging of SDT and MTC device trigger. Since small data and MTC device triggers packets only have limited size, there is no need to charge the MTC UE based on packet size but numbers of how many SDT or MTC device trigger are being successfully delivered. The MTC-IWF can simply have a counter for MO/MT SDT and MTC device trigger charging.

Next, a configuration example of the MTC-IWF 40 according to this exemplary embodiment will be described with reference to FIG. 4.

As show in FIG. 4, the MTC-IWF 40 includes a relay unit 41, a count unit 42, and a generation unit 43. The relay unit 41 relays MO SD messages, MT SD messages or MTC device trigger messages over the control plane between the MTC UE 10 and the SCS 50. The count unit 42 counts the number of messages successfully relayed by using e.g., the abovementioned COUNTER. The generation unit 43 generates the MO-SD-CDR, the MT-SD-CDR or the TRIGGER-CDR in accordance with the counted number. The MTC-IWF 40 can include a transfer unit 44 which transfers the generated CDR to the OCF/CDF 30. Note that these units 41 to 44 are mutually connected with each other through a bus or the like. These units 41 to 44 can be configured by, for example, transceivers which conduct communication with the MTC UE 10, the SCS 50, the OCF/CDF 30 and other network nodes within the core network, and a controller such as a CPU (Central Processing Unit) which controls these transceivers.

Note that the present invention is not limited to the above-mentioned exemplary embodiment, and it is obvious that various modifications can be made by those of ordinary skill in the art based on the recitation of the claims.

The whole or part of the exemplary embodiment disclosed above can be described as, but not limited to, the following supplementary notes.

(Supplementary Note 1)

New interfaces (Roi and Rfi) between MTC-IWF and OCF/CDF are defined for CDRs delivery.

(Supplementary Note 2)

MTC-IWF is configured with address of OCF or CDF.

(Supplementary Note 3)

The counters are defined and configured in MTC-IWF for MO and MT SDT or MTC device trigger delivery charging.

(Supplementary Note 4)

MTC-IWF records the information for charging.

(Supplementary Note 5)

MTC-IWF is configured with event triggers for CDRs generation such that it determines which CDR to generate.

(Supplementary Note 6)

New CDRs are defined: MO-SD-CDR for MO SDT charging, MT-SD-CDR for MT SDT charging and TRIGGER-CDR for MTC device trigger delivery charging.

(Supplementary Note 7)

MTC-IWF delivers the CDR type, Counter, UE identifier and subscriber ID if available in CDRs to OCF or CDF for online and offline charging separately, over the newly defined interfaces.

This application is based upon and claims the benefit of priority from Japanese patent application No. 2013-189776, filed on Sep. 12, 2013, the disclosure of which is incorporated herein in its entirety by reference.

REFERENCE SIGNS LIST

10 MTC UE
20 MME
30 OCF/CDF
31 OCF
32 CDF
40 MTC-IWF
41 RELAY UNIT
42 COUNT UNIT
43 GENERATION UNIT
44 TRANSFER UNIT
50 SCS

The invention claimed is:

1. A mobile communication system comprising:
a UE (User Equipment);
a CDF (Charging Data Function) or a CGF (Charging Gateway Function);
an SCS (Service Capability Server); and
an MTC-IWF (Machine Type Communication-Interwork Function), wherein
the SCS is configured to send information on a device trigger to the MTC-IWF, and
the MTC-IWF is configured to:
send the information to the UE;
generate a CDR (Charging Data Record) including a field of an address of the MTC-IWF when the MTC-IWF receives a response from the UE that successfully received the information; and
forward the CDR to the CDF or the CGF for charging of the device trigger.

2. The mobile communication system of claim 1, wherein the MTC-IWF is configured to check that the SCS is authorized to perform the device trigger.

3. The mobile communication system of claim 1, wherein the CDR further includes an identifier of the UE.

4. A method of a mobile communication system including: a UE (User Equipment); a CDF (Charging Data Function) or a CGF (Charging Gateway Function); an SCS (Service Capability Server); and an MTC-IWF (Machine Type Communication-Interwork Function), the method comprising;
sending information on a device trigger to the MTC-IWF;
sending the information to the UE;
generating a CDR (Charging Data Record) including a field of an address of the MTC-IWF when the MTC-IWF receives a response from the UE that successfully received the information; and
forwarding the CDR to the CDF or the CGF for charging of the device trigger.

5. An MTC-IWF (Machine Type Communication-Interwork Function) of a mobile communication system including: a UE (User Equipment); a CDF (Charging Data Function) or a CGF (Charging Gateway Function); and an SCS (Service Capability Server), the MTC-IWF comprising:
a receiver configured to receive information on a device trigger from the SCS;
a sender configured to send the information to the UE; and
a controller configured to:
generate a CDR (Charging Data Record) including a field of an address of the MTC-IWF when the MTC-IWF receives a response from the UE that successfully received the information; and
forward the CDR to the CDF or the CGF for charging of the device trigger.

6. The MTC-IWF of claim 5, wherein the MTC-IWF is configured to check that the SCS is authorized to perform the device trigger.

7. The MTC-IWF of claim 5, wherein the CDR further includes an identifier of the UE.

8. A method of an MTC-IWF (Machine Type Communication-Interwork Function) of a mobile communication system including: a UE (User Equipment); a CDF (Charging Data Function) or a CGF (Charging Gateway Function); and an SCS (Service Capability Server), the method comprising:
receiving information on a device trigger from the SCS;
sending the information to the UE;
generating a CDR (Charging Data Record) including a field of an address of the MTC-IWF when the MTC-IWF receives a response from the UE that successfully received the information; and
forwarding the CDR to the CDF or the CGF for charging of the device trigger.

9. A UE (User Equipment) of a mobile communication system including: a CDF (Charging Data Function) or a CGF (Charging Gateway Function); an MTC-IWF (Machine Type Communication-Interwork Function); and an SCS (Service Capability Server), the UE comprising:
a receiver configured to receive information on a device trigger from the MTC-IWF which receives the information from the SCS; and
a sender configured to send a response upon successfully receiving the information,
wherein the MTC-IWF generates a CDR (Charging Data Record) including a field of an address of the MTC-IWF when the MTC-IWF receives the response from the UE and forwards the CDR to the CDF or the CGF for charging of the device trigger.

10. The UE of claim 9, wherein the MTC-IWF is configured to check that the SCS is authorized to perform the device trigger.

11. The UE of claim 9, wherein the CDR further includes an identifier of the UE.

12. A method of a UE (User Equipment) of a mobile communication system including: a CDF (Charging Data Function) or a CGF (Charging Gateway Function); an MTC-IWF (Machine Type Communication-Interwork Function); and an SCS (Service Capability Server), the method comprising:
   receiving information on a device trigger from the MTC-IWF which receives the information from the SCS; and
   sending a response upon successfully receiving the information,
   wherein the MTC-IWF generates a CDR (Charging Data Record) including a field of an address of the MTC-IWF when the MTC-IWF receives the response from the UE and forwards the CDR to the CDF or the CGF for charging of the device trigger.

* * * * *